Dec. 1, 1936.      M. L. ENGLER      2,062,871
STITCHING APPARATUS
Filed Oct. 31, 1935
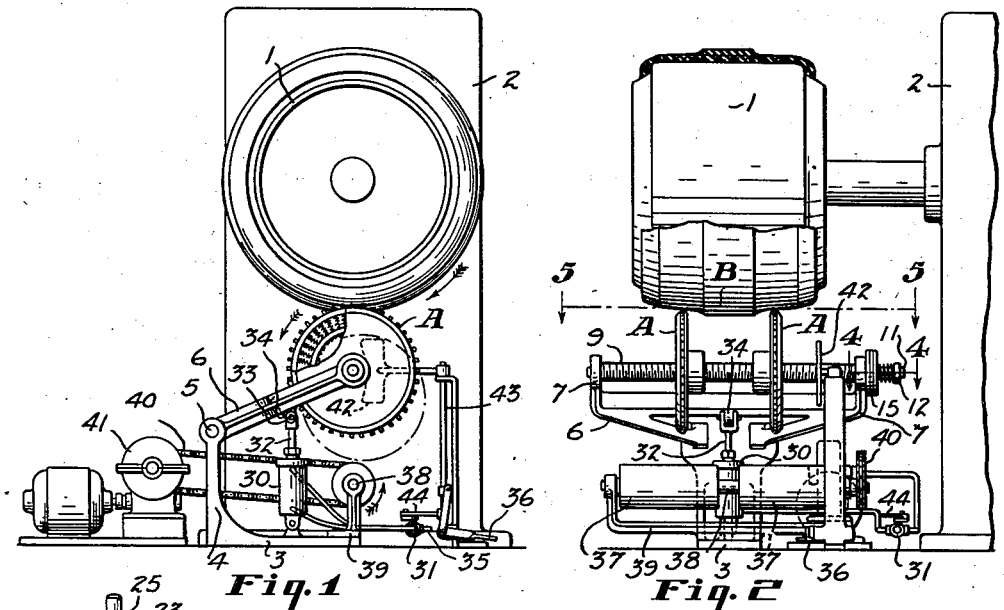
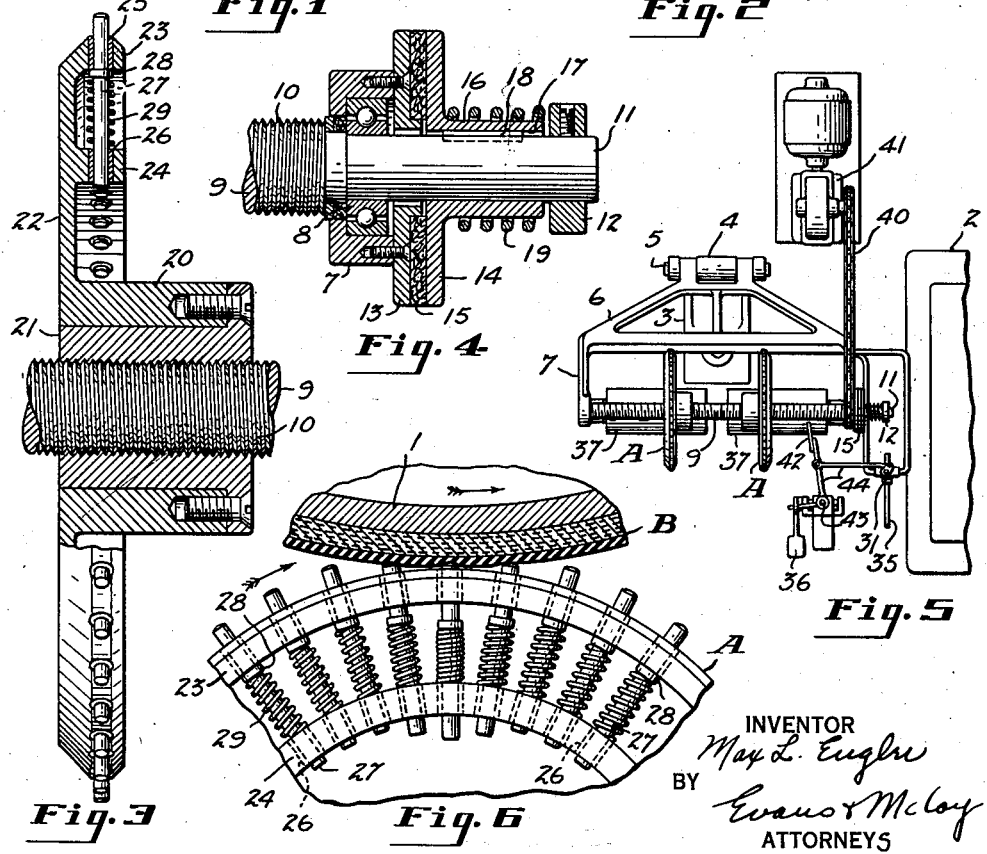

Patented Dec. 1, 1936

2,062,871

UNITED STATES PATENT OFFICE 2,062,871

STITCHING APPARATUS

Max L. Engler, Akron, Ohio, assignor to The General Tire & Rubber Company, Akron, Ohio, a corporation of Ohio Application October 31, 1935, Serial No. 47,576

9 Claims. (Cl. 154—9)

This invention relates to apparatus for building pneumatic tires, and more particularly to means for stitching tire stock on the tire carcass.

One of the objects of the present invention is to provide new and improved means for stitching tire stock, and particularly the tread stock, to pneumatic tire casings.

Another object of the present invention is to provide a stitching wheel for tire building machines of such construction that during the stitching operation it has the tendency to crowd the material being stitched in the direction of rotation, whereby to provide a more efficient stitching action.

Another object is to provide a stitching wheel for tire building apparatus in which the stitching operation is accomplished by a plurality of radially movable stitching fingers.

With the above and other objects in view, the present invention consists of certain features of construction and combinations of parts to be hereinafter described with reference to the accompanying drawing, and then claimed.

In the drawing, which illustrates a suitable embodiment of the invention,

Figure 1 is an end elevation of a tire building drum showing the stitching apparatus associated therewith;

Fig. 2 is a side elevation of the apparatus shown in Fig. 1;

Fig. 3 is an enlarged view of the stitching wheel, a portion of the same being shown in section;

Fig. 4 is a section taken through the friction brake, taken approximately on the line 4—4 of Fig. 2;

Fig. 5 is a plan view of the stitching apparatus taken as looking in the direction of the arrows 5—5 shown in Fig. 2; and Fig. 6 is an enlarged fragmentary view showing the stitching wheel in the act of stitching the tire stock to the tire being constructed on the building drum.

Referring to the accompanying drawing, in which like numerals refer to like parts throughout the several views, the stitching apparatus of the present invention is shown in Figs. 1 and 2 as being associated with a rotatable tire building drum 1 which is rotatably supported by a standard 2.

The stitching apparatus includes a base portion 3 having an upstanding arm 4 offset as shown in Fig. 1 from the building drum 1. Pivoted to the arm 4 by means of a pivot pin 5 is a yokelike member 6 having arms 7 which are located below the tire building drum 1. Each of the arms 7 is preferably provided with an antifriction bearing 8 within which the ends of a shaft 9 are journalled. The shaft 9 is provided with right and left screw threads 10, and one end 11 of the shaft 9 projects through the arm 7 as shown in Fig. 4. This projecting end 11 of the shaft 9 is provided at its outer end with a fixed collar 12, and the bearing supporting portion of the arm 7 is provided with a fixed friction disk 13. Slidably mounted upon the end 11 of the shaft 9 between the collar 12 and the disk 13 is a disklike member 14 having a facing 15 of any suitable friction material. The member 14 is provided with a sleeve portion 16 which surrounds the shaft end 11 and which is slotted at 17 to slidably receive a key 18 that is carried by the shaft end 11, the key having sufficient clearance with the slot 17 so that the sleeve 16 will slide relative to the key 18 and shaft end. Surrounding the sleeve 16 is a compression spring 19, the ends of which engage with the disklike member 14 and the collar 12 to resiliently urge the friction-faced member 14 against the fixed disk 13.

Threadably mounted upon the right and left threads is a pair of stitching wheels "A", the one wheel being threaded on the right threads and the other wheel being threaded on the left threads as shown in Fig. 2.

Each of these stitching wheels comprises an annular hub portion 20 which carries a threaded sleeve 21 that is threaded on the shaft as previously described, the hub portion 20 is also provided with a radially circular disk portion 22. The disk portion 22, as shown in Figs. 3 and 6, is formed with an outer axially extending circumferential flange 23 and an inner axially extending circumferential flange 24 which is concentric with the flange 23 and which is spaced therefrom. The flange 23 is provided with a series of regularly spaced radial openings, each of which carries an annular bushing 25. The inner flange 24 is likewise provided with a series of regularly spaced openings extending therethrough, each of which is provided with an annular bushing 26. Each annular bushing 26 is in axial alignment with an annular bushing 25.

Mounted within each pair of bushings 25 and 26 for sliding movement is a pinlike member or finger 27, the outer end of which normally projects radially beyond the flange 23 as shown in Fig. 3. Each finger 27 is provided with a collar portion 28 which engages with the inner face of the flange 23 to limit the finger 27 against outward movement beyond its normal position, and surrounding the member 27 is a compression spring 29 which has its ends engaged with the collar portion 28 and the circumferentially outer face of the flange 24 whereby to urge the member 27 to its normal position.

Associated with the stitching apparatus is a fluid pressure cylinder 30 having fluid connections with a suitable valve 31 and a plunger (not shown) the plunger rod 32 of which is pivoted at 33 to a lug 34 carried by the yoke 6. The valve 31 is connected by means of a conduit 35 with a source of fluid pressure and is arranged to be operated by the foot pedal 36 shown in Figs. 1 and 5.

Disposed below the stitching wheels, drums 37 are mounted on a rotatable shaft 38 that is journalled in a suitable bracket 39 secured to the base 3. The shaft 38 is driven by means of a belt 40 or any other suitable means from a motor driven gear box or speed reducing unit 41.

During the operation of building up a tire carcass the drums 37 are continuously rotated in a counter-clockwise direction, as viewed in Fig. 1, and normally the stitching wheels A rest upon the drums 37, which, during rotation, thread the wheels A inwardly toward each other, so that the hub portions 20 thereof abut each other, in which case the stitching wheels A and shaft are rotated in a clockwise direction against the resistance of the disks 13 and 14.

When it is desired to stitch the tire stock, such as tread stock, to the tire band which has been provided on the drum 1, the operator actuates the pedal 36 to open the valve 31 which allows fluid under pressure to act against the plunger pressure cylinder 30 and move the yoke 6 in an upward direction to bring the stitching wheels A into contact with the tread stock on the building drum. Sufficient pressure is exerted by the plunger to depress the fingers 27 which are immediately below the stock on the tire building drum, as shown in Fig. 6, to allow the outer flange 23 to substantially engage with the tread stock B. Since the tire drum is rotating as viewed in Fig. 1 in a clockwise direction, the contact of the tread stock B with the outer flange 23 rotates the stitching wheels A in a counter-clockwise direction. Rotation of the wheels A causes them to thread outwardly away from each other on the shaft 9, the friction brake comprising the disks 13 and 14 holding the shaft against rotation to permit the outwardly threading movement of the stitching wheels A. The stitching wheels A are thus caused to travel from the central portion of the tread stock during their rotation outwardly towards and beyond the edges of the tread stock.

Inasmuch as the peripheral surface of the flange 23 rotates at the same peripheral speed as the stock being stitched, the outer ends of the fingers 27 which are not in contact with the tread stock B move at the higher peripheral speed. As they come in contact with the tread stock B they are gradually depressed radially inwardly, and their peripheral speed gradually decreases to the approximate speed of the flange 23, and because of this, the fingers 27 have a tendency to crowd the tread stock being stitched in a forward direction, or rather in the direction of travel of rotation of the tread stock B, and thus provide, through the crowding action, a more efficient stitching operation.

The threads 10 are so arranged that the stitching wheels will rotate several times during each revolution of the tire building drum 1, so that the tread stock will be substantially continuously stitched at all points throughout its width.

After the stitching operation is completed one of the stitching wheels contacts with a member 42, which pivots to actuate the valve 31 through a shaft 43 and linkage 44, whereby the stitching wheels are lowered into position upon the drums 37. Since these drums are rotating in a direction opposite to the building drum 1 they cause the stitching wheels "A" to thread axially inwardly along the shaft to their normal substantial abutting position. When the wheels A come into abutting engagement with each other, continued rotation of the drums 37 causes the shaft 9 to rotate, the pressure of the spring 19 being such that the friction disks 13 and 14 will allow the shaft 9 to rotate.

While I have shown a fluid pressure cylinder for moving the stitching wheels into engagement with the material on the tire building drum, it is to be understood that other means may be provided for producing this engagement and also that the shaft for the stitching wheels may be supported in any suitable manner.

Although a single embodiment of the invention has been herein shown and described, it will be understood that numerous details of the construction shown may be altered or omitted without departing from the spirit of this invention as defined in the following claims.

What I claim is:

1. A stitching wheel comprising a rotatable member, a plurality of radial stock engaging elements mounted on said member for sliding movement radially of said member and having their radially outermost ends normally projecting radially beyond the periphery of said member, and resilient means urging said elements toward their normal projecting position.

2. A stitching wheel comprising a rotatable member, a plurality of radial stock engageable elements mounted on said member for sliding movement radially of said member, said elements having their outermost ends projecting radially beyond the periphery of said member and having stop means normally engageable with said member to predetermine the normal projecting position thereof, and resilient means for resiliently opposing radially inward movement of said elements.

3. A stitching wheel comprising a rotatable disk-like member having a plurality of radial openings therein, stock engaging elements slidably mounted in said openings and having their ends normally projecting beyond the periphery of said member, stop means for limiting said elements to their normal projecting position, and resilient means for resiliently opposing radially inward sliding movement of said elements.

4. A stitching wheel comprising a rotatable member, an outer series of circumferentially arranged radial openings, an inner series of circumferentially arranged radial openings spaced therefrom, each opening of one series being axially aligned with an opening of the outer series, a plurality of pinlike elements, each element being slidably mounted in a pair of the aligned openings and having its outer end normally projecting beyond the periphery of said member, each element having a shoulder thereon normally engaging the innermost edge portions of the outermost opening, and a coiled spring having one end engaged with said shoulder and its opposite end engaged with the outermost edge portion of the innermost opening.

5. A stitching wheel comprising a disk-like member having spaced axially-extending annular flanges, a series of radial openings in each of said flanges, each opening of one flange being aligned with an opening of the other flange, a pin-like element slidably mounted in each pair of aligned openings and having its outer end normally projecting beyond the periphery of said member, each element having a transverse portion normally engaging the radially inner surface of the radially outer flange, and a coiled spring surrounding the pin-like element and having its ends abutting said transverse portion and the radially outer surface of the radially inner flange.

6. The combination with a rotatable tire building drum of a rotatable stitching wheel rotatable through contact with the tire material on said drum to be stitched, comprising a rotatable member, a plurality of radial stock engageable elements, means for slidably supporting said elements on said member with the ends thereof normally projecting beyond the periphery of said member, and resilient means for resiliently opposing radially inward movement of said elements.

7. The combination with a rotatable tire building drum of a rotatable stitching wheel rotatable through contact with the tire material on said drum to be stitched, comprising a rotatable member, a plurality of radial stock engageable elements, means for slidably supporting said elements on said member with the ends thereof normally projecting beyond the periphery of said member, resilient means for resiliently opposing radially inward movement of said elements, a supporting structure for said stitching wheel and means for holding said wheel in engagement with the material on said drum with a pressure sufficient to move said stock engageable elements radially inwardly upon engagement with the tire material on said drum.

8. The combination with a rotatable tire building drum, of a stitching apparatus comprising a right and left threaded screw shaft, a pair of stitching wheels, one being threaded on the right threaded portion of said shaft and the other being threaded on the left threaded portion of said shaft, said stitching wheels normally being substantially engaged with each other at a region intermediate the ends of said shaft, a support for rotatably supporting the ends of said shaft, means for moving said support towards said drum whereby to move said wheels into pressure engagement with the tire material on said drum whereby rotation of said drum causes said wheels to thread outwardly along said shaft and stitch said tire material, frictional slip means associated with said shaft and support to hold said shaft against rotation during the stitching operation, and means rotatable in a direction opposite to said drum, said stitching wheels being engageable with said last mentioned means whereby rotation of said last mentioned means threads said wheel axially inwardly along said shaft to their normal substantially abutting portions.

9. The combination with a rotatable tire building drum, of a stitching apparatus comprising a right and left threaded screw shaft, a pair of stitching wheels, one being threaded on the right threaded portion of said shaft and the other being threaded on the left threaded portion of said shaft, said stitching wheels normally being substantially engaged with each other at a region intermediate the ends of said shaft, a support for rotatably supporting the ends of said shaft, means for moving said support towards said drum whereby to move said wheels into pressure engagement with the tire material on said drum whereby rotation of said drum causes said wheels to thread outwardly along said shaft and stitch said tire material, frictional slip means associated wtih said shaft and support to hold said shaft against rotation during the stitching operation, and means rotatable in a direction opposite to said drum, said stitching wheels being engageable with said last mentioned means whereby rotation of said last mentioned means threads said wheels axially inwardly along said shaft to their normal substantially abutting portions, said frictional slip means being arranged to permit rotation of said shaft after said wheels are in their normal positions.

MAX L. ENGLER.